(12) United States Patent
Goto et al.

(10) Patent No.: US 11,718,533 B2
(45) Date of Patent: Aug. 8, 2023

(54) POWER STORAGE DEVICE

(71) Applicant: KUNIMINE INDUSTRIES CO., LTD., Tokyo (JP)

(72) Inventors: Yuta Goto, Iwaki (JP); Susumu Shinoki, Iwaki (JP); Atsutomo Tsuchiya, Iwaki (JP); Tomohiro Ito, Yonezawa (JP); Kazuhiro Tachibana, Yonezawa (JP)

(73) Assignee: KUNIMINE INDUSTRIES CO., LTD., Tokyo (JP)

( * ) Notice: Subject to any disclaimer, the term of this patent is extended or adjusted under 35 U.S.C. 154(b) by 108 days.

(21) Appl. No.: 17/424,428

(22) PCT Filed: Jan. 8, 2020

(86) PCT No.: PCT/JP2020/000333
§ 371 (c)(1),
(2) Date: Jul. 20, 2021

(87) PCT Pub. No.: WO2020/162092
PCT Pub. Date: Aug. 13, 2020

(65) Prior Publication Data
US 2022/0089450 A1 Mar. 24, 2022

(30) Foreign Application Priority Data
Feb. 8, 2019 (JP) ................. 2019-022129

(51) Int. Cl.
*C01B 33/40* (2006.01)
*H01G 4/008* (2006.01)
*H01G 4/12* (2006.01)
*H01G 4/33* (2006.01)
*H01M 50/409* (2021.01)

(52) U.S. Cl.
CPC ............. *C01B 33/40* (2013.01); *H01G 4/008* (2013.01); *H01G 4/1209* (2013.01); *H01G 4/33* (2013.01); *C01P 2004/24* (2013.01); *H01M 50/409* (2021.01)

(58) Field of Classification Search
CPC ...... C01B 33/40; C01P 2004/24; H01G 4/008; H01G 4/08; H01G 4/1209; H01G 4/129; H01G 4/30; H01G 4/33
See application file for complete search history.

(56) References Cited

U.S. PATENT DOCUMENTS

| | | |
|---|---|---|
| 2008/0117563 A1 | 5/2008 | Nagata et al. |
| 2014/0254062 A1* | 9/2014 | Namdar Khojasteh .. H01G 4/30 361/301.4 |
| 2019/0385763 A1 | 12/2019 | Jin et al. |

FOREIGN PATENT DOCUMENTS

| | | | |
|---|---|---|---|
| JP | H08153646 A | * | 6/1996 |
| JP | 10-269844 A | | 10/1998 |

(Continued)

OTHER PUBLICATIONS

Japanese Office Action for Japanese Application No. 2019-022129, dated Apr. 5, 2022, with English translation.

(Continued)

*Primary Examiner* — Nathan Milakovich
(74) *Attorney, Agent, or Firm* — Birch, Stewart, Kolasch & Birch, LLP

(57) ABSTRACT

A power storage device, containing two electrodes, and a plate-like crystal structure smectite-based clay film between the electrodes.

7 Claims, 1 Drawing Sheet

(56) References Cited

FOREIGN PATENT DOCUMENTS

| JP | 2007-98707 A | | 4/2007 |
|----|----|----|----|
| JP | 2008-130844 A | | 6/2008 |
| JP | 2018-41670 A | | 3/2018 |
| JP | 2018041670 A | * | 3/2018 |
| WO | WO 2017/138382 A1 | | 8/2017 |
| WO | WO 2018/096910 A1 | | 5/2018 |

OTHER PUBLICATIONS

Japanese Office Action for corresponding Japanese Application No. 2019-022129, dated Aug. 16, 2022, with English translation.
International Search Report for PCT/JP2020/000333 (PCT/ISA/210) dated Mar. 10, 2020.

* cited by examiner

POWER STORAGE DEVICE

FIELD OF THE INVENTION

The present invention relates to a power storage device using a clay mineral as a dielectric, specifically to a power storage device in which a thin film or the like made of a clay mineral is interposed as a dielectric between electrodes.

BACKGROUND OF THE INVENTION

One specific example of the power storage device is a capacitor for a digital device. The capacitor for a digital device has different required characteristics depending on an application and a purpose, but in recent years, a multilayer ceramic capacitor having excellent frequency characteristics and high durability has become mainstream. The value of a dielectric constituting this type of multilayer ceramic capacitor is increased by technological evolution due to miniaturization and an increase in durability. However, in such a miniaturization technique, a processing technique is high in cost. Therefore, development of a new material capable of implementing processing in a nano region at low cost is required.

SUMMARY OF THE INVENTION

Technical Problem

A dielectric of a power storage body widely used at present is microfabricated in units of nanometers in order to increase capacity. However, a conventional microfabricated capacitor or the like in units of nanometers is still unsatisfactory from a viewpoint of providing a dielectric that has a high dielectric constant but is inexpensive and a method for manufacturing the dielectric.

The present invention provides a power storage device using a high-capacity and inexpensive microfabricated dielectric and a method for manufacturing the power storage device.

Solution to Problem

As a result of various studies, the present inventors have found that when an ultrafine laminated structure having a thickness of about 1 nm peculiar to a smectite-based clay and obtained by laminating a repeating unit is used as a dielectric, the dielectric has a high relative dielectric constant value, and therefore the dielectric can be formed into an electronic device in which the number of laminated sheets (density) by conventional microfabrication of a dielectric is several hundred times and a small size and a large capacity can be achieved as compared with an existing dielectric. Based on this finding, the present inventors have made studies and completed the present invention.

The above problems of the present invention have been solved by the following means.

<1>

A power storage device, containing:
two electrodes; and
a plate-like crystal structure smectite-based clay film between the electrodes.

<2>

The power storage device described in <1>, in which a metal oxide film is formed on a surface connected to both or one of the clay films of a current collector having electrical conductivity.

<3>

The power storage device described in <1> or <2>, in which in the plate-like crystal structure smectite-based clay film, an interlayer ion of bentonite or smectite is selected from the group consisting of a sodium ion, a lithium ion, and a trimethylstearylammonium ion.

<4>

The power storage device described in any one of <1> to <3>, containing a separator between the upper and lower electrodes.

The electrodes of the power storage device of the present invention have electrical conductivity capable of ohmic contact with a lead.

Advantageous Effects of Invention

In the power storage device of the present invention, an ultrafine laminated structure having a thickness of about 1 nm peculiar to a smectite-based clay and usually obtained by laminating a repeating unit until reaching a film thickness of a minimum 1 nm to a maximum is used as a dielectric. An electronic device in which the number of laminated sheets (density) by conventional microfabrication of a dielectric is several hundred times and a small size and a large capacity can be achieved as compared with an existing dielectric can be manufactured. Furthermore, bentonite to be used uses naturally produced smectite, a synthetic product of smectite, or an interlayer ion substitute of smectite as a member, has excellent safety, and can be easily processed and provided at a relatively low cost from a viewpoint of preparation of a dielectric and a power storage device.

The above and other features and advantages of the present invention will become more apparent from the following description appropriately with reference to the attached drawings.

DESCRIPTION OF EMBODIMENTS

Next, a preferable embodiment of the present invention will be described with reference to FIGS. 1 to 3.

Figure 1:
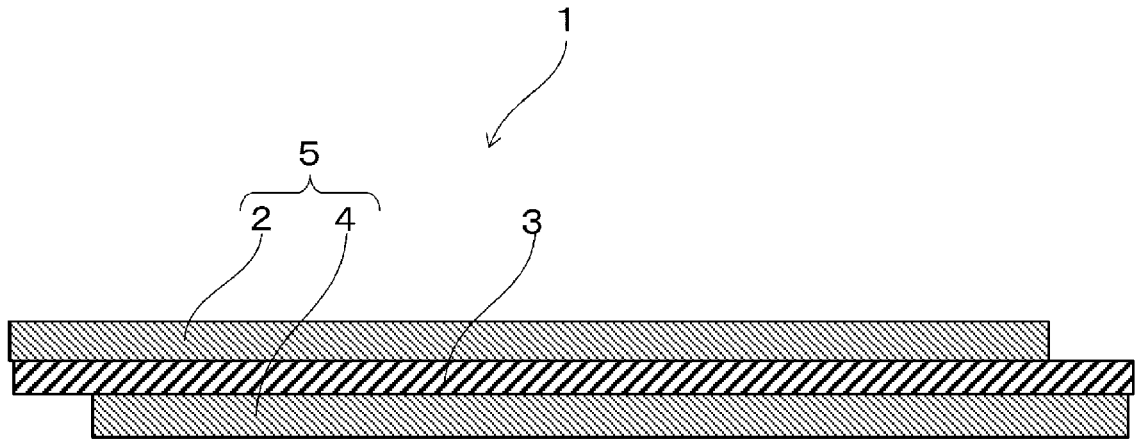
FIG. 1 is a cross-sectional view schematically illustrating a preferable embodiment of a power storage device according to the present invention.

As illustrated in FIG. 1, a power storage device 1 includes an upper electrode 2, a lower electrode 4, and a clay dielectric 3 therebetween. The clay dielectric 3 refers to the above-described silicate compound or smectite-based clay mineral having a plate-like crystal structure. Examples of the smectite-based clay mineral includes montmorillonite, hectorite, stevensite, and saponite. A metal current collector is used for the upper electrode 2 and the lower electrode 4 sandwiching a thin film or powder of clay mineral. The upper electrode 2 and the lower electrode 4 only need to be in contact with the clay dielectric 3.

The thickness of the dielectric is preferably 0.01 to 1 mm, but is not limited thereto.

This power storage device stores power by a fine structure of clay.

In order to control the water content of the clay dielectric 3, the power storage device 1 is preferably sealed with a waterproof and gas barrier material. For example, a method for sealing the power storage device 1 using a metal case or a method for preventing moisture evaporation by exterior coating of a film using a lamination method may be used. The film used at this time is preferably excellent in water resistance, water vapor barrier properties, and gas barrier properties. The water content of the clay dielectric 3 is preferably 1 to 20% by mass, and more preferably 5 to 15% by mass.

As the clay mineral, at least one kind of clay selected from natural or synthetic clays is used. Such a clay may be unmodified or modified, but is preferably at least one kind selected from smectite-based clays such as bentonite and hectorite. Among these clays, bentonite is an inorganic clay that is naturally produced, and is therefore excellent in safety. In addition, bentonite is stable for a long period of time without being decomposed by microorganisms in the soil, and is inexpensive. Therefore, bentonite is a particularly preferable clay mineral. As the clay mineral, one kind of clay selected from bentonite and smectite can be used singly, or two kinds of clays can be used. Interlayer ions of bentonite and smectite are not particularly limited.

In the present invention, the plate-like crystal structure smectite refers to, for example, a flat plate-like clay crystal having a thickness of about 1 nm and a width/thickness aspect ratio of preferably 20 to 2000, more preferably about 30 to 300. The aspect ratios of representative smectite-based products (manufactured by KUNIMINE INDUSTRIES, LTD.) are illustrated in <Table 1>, but the present invention is not limited thereto.

TABLE 1

| | Aspect ratio (AFM observation result) |
|---|---|
| KUNIPIA F (manufactured by KUNIMINE INDUSTRIES CO., LTD., montmorillonite purified product) | 300 |
| SUMECTON SA (manufactured by KUNIMINE INDUSTRIES CO., LTD., saponite synthetic product) | 80 |
| SUMECTON ST (manufactured by KUNIMINE INDUSTRIES CO., LTD., stevensite synthetic product) | 30 |
| SUMECTON SWN (manufactured by KUNIMINE INDUSTRIES CO., LTD., hectorite synthetic product) | 50 |

In order to dispose the clay mineral, it is desirable that the clay mineral is applied as a dispersion liquid to surfaces of the upper electrode 2 and the lower electrode 4 and naturally dried (usually, water content: 10% by mass), a similar clay dispersion liquid is applied again to the upper electrode 2 or the lower electrode 4 to which the dispersion liquid has been applied, the upper electrode 2 and the lower electrode 4 are bonded to each other, and the dispersion liquid is naturally dried.

When the clay mineral is applied to the upper electrode 2 or the lower electrode 4, it is desirable to disperse the clay mineral in a solvent such as water and then apply the dispersed clay mineral. A dispersion medium that can dissolve or disperse the clay mineral can be used depending on characteristics of the clay. Although it is also possible to form a layer of the clay mineral between the upper electrode 2 and the lower electrode 4 in a powder state, it is necessary to take measures against scattering, to control a coating thickness, and to prevent generation of a defect. In order to prevent a short circuit, a binder may be used to fix the clay mineral between the electrodes. Examples of the binder include a styrene-butadiene rubber-based binder, an acrylic polymer-based binder, a polyvinylidene fluoride-based binder, and a polytetrafluoroethylene-based binder.

In addition, various additive components can be blended as optional components in the clay dielectric as necessary without impairing the object of the present invention.

The upper electrode 2 or the lower electrode 4 is preferably made of a current collector, for example, a metal such as Pt, Au, Ti, Ag, Cu, Pb, Fe, Cd, Al, Zn, Mg, or Li, an alloy such as stainless steel, brass (Cu—Zn), cast iron, steel, or an aluminum alloy, graphite, or a conductive polymer.

Any of the electrodes 2 and 4 and an electrode 7 may be subjected to a surface treatment to be formed into a functionalized electrode. Examples of the surface treatment method include plating by coating with a metal thin film, electroless plating, vapor phase plating (CVD method), an etching method by an anode treatment, an anodic oxidation chemical treatment, electrolytic polishing, chemical modification, electroforming, carbon coating, and a carbide treatment. In particular, an anode oxide film of aluminum is also excellent in corrosion resistance and abrasion resistance, and is a preferable electrode.

In order to prevent a short circuit, a separator can be used between the upper and lower electrodes. FIG. 3 illustrates a power storage device 6 using a separator 11.

The separator 11 isolates dielectrics 10 and 12 from each other between an upper electrode 8 and a lower electrode 9, and allows metal ions and electrons to pass therethrough while preventing contact between the upper and lower electrodes and a short circuit of current. The type of the separator 11 is not particularly limited, and examples thereof include a separator made of an olefin-based resin, a separator made of a PDF-based resin, a separator made of a PAN-based resin, and a separator made of a PMMA-based resin. Specifically, the separator 11 may be constituted by a synthetic resin-based porous film made of a polyacrylonitrile resin, a vinylidene fluoride resin, an acrylic resin, a urethane-based resin, polyethylene, polypropylene, or the like, or a ceramic porous film, or may be constituted by laminating two or more kinds of these porous films.

The separator 11 is preferably impregnated with a dispersion liquid of clay serving as a dielectric and naturally dried.

EXAMPLES

Next, the present invention will be described in more detail based on the following Examples. The present invention is not limited by these Examples at all.

Examples 1 to 4

As illustrated in FIG. 1, the following clay aqueous dispersion liquid was applied onto the upper electrode 2 having a thickness of 0.1 mm× an area S ($mm^2$) and the lower electrode IV having a thickness of 0.1 mm× an area S+2 ($mm^2$), and naturally dried (water content of applied clay: 10% by mass). A similar clay aqueous dispersion liquid to the above was further applied to the upper electrode 2 and the lower electrode 4 as a binder and sandwiched therebetween without a gap, and the resultant was naturally dried in a similar manner to obtain the clay dielectric 3 (thickness d=0.07 mm), thereby forming the power storage device 1.

SUS 430 was used as a current collector 5 including the electrodes 2 and 4. The thickness of each of the electrodes 2 and 4 is 0.1 mm.

As the clay aqueous dispersion liquid, a clay mineral KUNIPIA F (trade name, manufactured by KUNIMINE INDUSTRIAL CO., LTD.) (Example 1), a clay mineral SUMECTON ST (trade name, manufactured by KUNIMINE INDUSTRIAL CO., LTD.) (Example 2), a clay mineral SUMECTON SA (trade name, manufactured by KUNIMINE INDUSTRIAL CO., LTD.) (Example 3), and a clay mineral SUMECTON SWN (trade name, manufactured by KUNIMINE INDUSTRIAL CO., LTD.) (Example 4) were used.

KUNIPIA F is a clay mineral obtained by purifying bentonite which is a natural product containing montmorillonite as a main component (Na ions are intercalated between layers). SUMECTON ST is a synthetic clay containing stevensite as a main component (Na ions are intercalated between layers). SUMECTON SA is a synthetic clay containing saponite as a main component (Na ions are intercalated between layers). SUMECTON SWN is a synthetic clay containing hectorite as a main component (Na ions are intercalated between layers). A cation exchange capacity CEO [meq/100 g] of the clay used in each of Example is described in Table 2.

TABLE 2

| | CEC [meq/100 g] |
|---|---|
| KUNIPIA F (manufactured by KUNIMINE INDUSTRIES CO., LTD., montmorillonite purified product) | 109 |
| SUMECTON SA (manufactured by KUNIMINE INDUSTRIES CO., LTD., saponite synthetic product) | 70 |
| SUMECTON ST (manufactured by KUNIMINE INDUSTRIES CO., LTD., stevensite synthetic product) | 34 |
| SUMECTON SWN (manufactured by KUNIMINE INDUSTRIES CO., LTD., hectorite synthetic product) | 48 |

<Measurement of Relative Dielectric Constant Using Power Storage Device 1>

Figure 2:
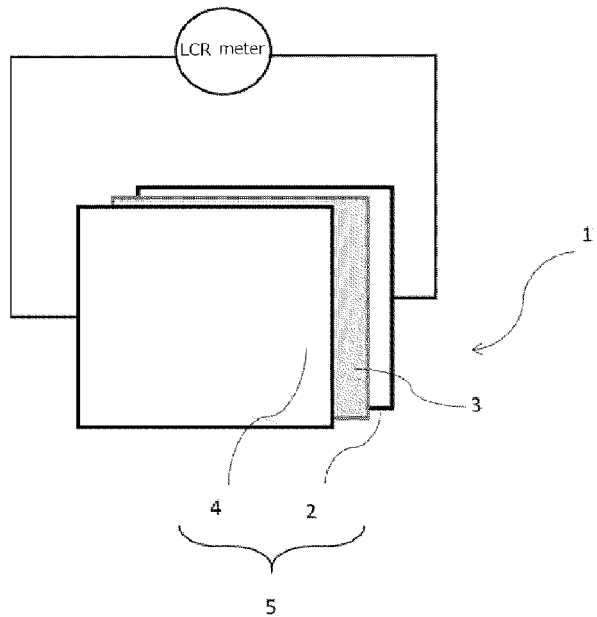
FIG. 2 is a configuration diagram schematically illustrating an example of relative dielectric constant measurement by a power storage device.

As illustrated in FIG. 2, an impedance Z [Ω] and a phase angle θ of the power storage device were measured at a level 100 mV using an LCR meter: HIOKI-3522-50 LCR Hi TESTER (manufactured by HIOKI E.E. CORPORATION), and a relative dielectric constant was measured.

In Example 1, in the above method for manufacturing a power storage device, $S=450$ mm$^2$, SUS 430 was used as the electrode 5, and KUNIPIA F was used as the dielectric.

In Example 2, in the above method for manufacturing a power storage device, $S=450$ mm$^2$, SUS 430 was used as the electrode 5, and SUMECTON ST was used as the dielectric.

In Example 3, in the above method for manufacturing a power storage device, $S=450$ mm$^2$, SUS 430 was used as the electrode 5, and SUMECTON SA was used as the current collector.

In Example 4, in the above method for manufacturing a power storage device, $S=450$ mm$^2$, SUS 430 was used as the electrode 5, and SUMECTON SWN was used as the current collector.

Results of measuring the relative dielectric constants at 100 Hz and 10 kHz in Examples 1 to 4 are described in Table 3.

TABLE 3

| | Example 1 | Example 2 | Example 3 | Example 4 |
|---|---|---|---|---|
| 100 Hz | 2213 | 5920 | 360015 | 378807 |
| 10 kHz | 90 | 94 | 79432 | 89406 |

As shown in Table 3, it has been found that in Examples 1 to 4, a high relative dielectric constant is obtained in a power storage device using a SUMECTON-based clay mineral as a dielectric. This indicates that an inexpensive power storage device having a high dielectric constant can be manufactured. A power storage device using SUMECTON SWN can obtain the highest relative dielectric constant, and is most preferable as a power storage device.

Examples 5 to 8

<Measurement of Relative Dielectric Constant of Power Storage Device Using Different Current Collector>

In Example 5 to 8, in the above manufacture of a power storage device, the current collector metal was changed to aluminum or brass, and KUNIPIA F or SUMECTON ST was used as the dielectric.

In Example 5, in the above method for manufacturing a power storage device, $S=95$ mm$^2$, $d=0.01$ mm, KUNIPIA F was used for the clay dielectric 3, and brass was used for the electrode.

In Example 6, in the above method for manufacturing a power storage device, $S=95$ mm$^2$, $d=0.01$ mm, SUMECTON ST was used for the clay dielectric 3, and brass was used for the electrode.

In Example 7, in the method for fabricating a power storage device, $S=95$ mm$^2$, $d=0.01$ mm, KUNIPIA F was used for the clay dielectric 3, and aluminum was used for the electrode.

In Example 8, in the above method for manufacturing a power storage device, $S=95$ mm$^2$, $d=0.01$ mm, SUMECTON ST was used for the clay dielectric 3, and aluminum was used for the electrode.

Relative dielectric constants at 100 Hz and 10 kHz in Example 5 to 8 were measured. Measurement results of the relative dielectric constants in Example 5 to 8 are described in Table 4.

TABLE 4

| | Example 5 | Example 6 | Example 7 | Example 8 |
|---|---|---|---|---|
| 100 Hz | 4709 | 144786 | 25067 | 11447 |
| 10 kHz | 678 | 13528 | 4595 | 1335 |

As is apparent from Table 4, it is indicated that a power storage device using brass or aluminum other than the electrode used in Example 1 as the current collector also functions, and a high relative dielectric constant was obtained.

Reference Example

A power storage device was manufactured in a similar manner to Example 1 except that $S=95$ mm$^2$, $d=0.3$ mm, a barium titanate powder (average particle size: 100 nm, purity: 99.9%), which is said to exhibit the highest performance as an existing dielectric, was used instead of the dielectric 3, and brass was used as the electrode in the above method for manufacturing a power storage device.

Relative dielectric constants at 100 Hz and 10 kHz were measured in a similar manner to Example 1, and results thereof (relative dielectric constants) are described in Table 5.

TABLE 5

|  | Reference Example |
|---|---|
| 100 Hz | 230 |
| 10 kHz | 7 |

From a comparison between the results of Tables 3 and 4 and the results of Table 5, it is found that each of the power storage devices of Example 1 to 8 using a smectite-based clay as the dielectric has a relative dielectric constant of several hundred to several thousand times higher than a power storage device using a barium titanate powder as the dielectric, and is a power storage device having excellent performance.

In Example 9, in the above method for manufacturing a power storage device, SUS was used as the electrode 5, and KUNIPIA RC-G (manufactured by KUNIMINE INDUSTRIES, LTD.) was used as the dielectric. KUNIPIA RC-G is a smectite-based clay obtained by replacing sodium ions with lithium ions as the interlayer ions of KUNIPIA F (CEC 40 [meq/100 g]).

In Example 10, in the above method for manufacturing a power storage device, SUS was used as the current collector, and KUNIVIS 110 (manufactured by KUNIMINE INDUSTRIES CO., LTD.) was used as the dielectric. KUNIVIS 110 is an organic modified smectite-based clay obtained by replacing sodium ions with trimethylstearylammonium ions as the interlayer ions of KUNIPIA F.

Results of measuring the relative dielectric constants at 100 Hz and 10 kHz in Example 9 and Example 10 are described in Table 6.

TABLE 6

|  | Example 9 | Example 10 |
|---|---|---|
| 100 Hz | 1019 | 482 |
| 10 kHz | 18 | 7 |

As is apparent from Table 6, a high relative dielectric constant was obtained also in a power storage device using the dielectric 3 in which the interlayer ions of the smectite-based clay were ion-exchanged. However, when sodium ions are mainly contained as the interlayer ions, a higher relative dielectric constant can be obtained.

Measurement of Relative Dielectric Constant Using Power Storage Device 6

Examples 11 and 12

Figure 3:
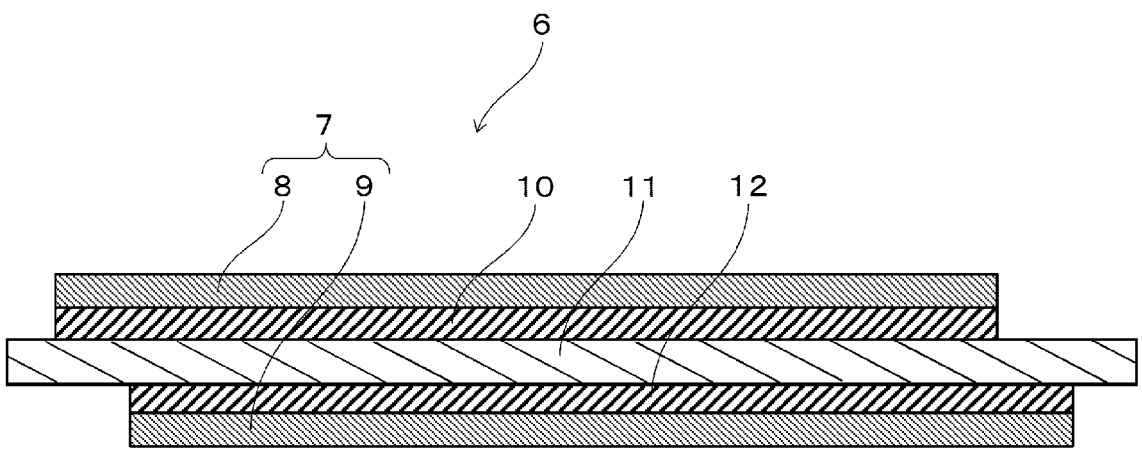
FIG. 3 is a schematic view of a power storage device using a separator.

As illustrated in FIG. 3, a clay dispersion liquid was applied onto the upper electrode 8 and the lower electrode 9 to obtain an upper dielectric 10 and a lower dielectric 12, respectively. A clay-impregnated separator 11 impregnated with a clay dispersion liquid was sandwiched between the upper dielectric 10 and the lower dielectric 12 to form the power storage device 6.

In Example 11, in the above method for manufacturing the power storage device 6, KUNIPIA F was used as the dielectric, and SUS 430 was used as the electrode.

In Example 12, in the above method for manufacturing the power storage device 6, SUMECTON ST was used as the dielectric, and SUS 430 was used as the electrode.

Relative dielectric constants at 100 Hz and 10 kHz in Examples 11 and 12 were measured. Measurement results of the relative dielectric constants in Examples 11 and 12 are described in Table 7.

TABLE 7

|  | Example 11 | Example 12 |
|---|---|---|
| 100 Hz | 83120 | 175196 |
| 10 kHz | 5792 | 3230 |

As is apparent from Table 7, a power storage device using a separator also functioned, and a high relative dielectric constant was obtained.

Examples 13 and 14

<Measurement of Relative Dielectric Constant of Power Storage Device in Which Electrode Surface is Subjected to Chemical Treatment>

In Example 13, in the above method for manufacturing the power storage device 2, $S=95$ mm$^2$, $d=0.01$ mm, KUNIPIA F was used as the dielectric, and (Al—Al$_2$O$_3$) obtained by subjecting a surface of an electrode 7 in contact with the upper dielectric 10 and the lower dielectric 12 to an anodic oxidation chemical treatment was used as the electrode 7. The Al$_2$O$_3$ oxide film obtained by the anodic oxidation chemical treatment is about 40 nm.

In Example 14, in the above method for manufacturing the power storage device 2, $S=95$ mm$^2$, $d=0.01$ mm, SUMECTON ST was used as the dielectric, and (Al—Al$_2$O$_3$) obtained by subjecting a surface of an electrode 7 in contact with the upper dielectric 10 and the lower dielectric 12 to an anodic oxidation chemical treatment was used as the electrode 7. The Al$_2$O$_3$ oxide film obtained by the anodic oxidation chemical treatment is about 40 nm.

Relative dielectric constants at 100 Hz and 10 kHz in Examples 13 and 14 were measured. Measurement results of the relative dielectric constants in Examples 13 and 14 are described in Table 8.

TABLE 8

|  | Example 13 | Example 14 |
|---|---|---|
| 100 Hz | 28133 | 61673 |
| 10 kHz | 4917 | 16916 |

As is apparent from Table 8, a high relative dielectric constant can be obtained also in a power storage device in which a dielectric using a smectite-based clay is in contact with an oxide film, and the power storage device has excellent performance.

The present invention has been described as related to the present embodiments. It is our intention that the invention not be limited by any of the details of the description unless otherwise specified, but rather be construed broadly within its spirit and scope as set out in the attached claims.

The present application claims priority on Patent Application No. 2019-022129 filed in Japan on Feb. 8, 2019, which is herein incorporated by reference as a part of the present specification.

DESCRIPTION OF SYMBOLS

1 Power storage device
2 Upper electrode

3 Clay dielectric
4 Lower electrode
5 Current collector
6 Power storage device
7 Electrode
8 Upper electrode
9 Lower electrode
10 Upper dielectric
11 Clay-impregnated separator
12 Lower dielectric

The invention claimed is:

1. A power storage device, comprising:
   two electrodes; and
   a plate-like crystal structure smectite-based clay film between the electrodes,
   wherein the plate-like crystal structure smectite-based clay film is a dielectric and has a water content of 5 to 15% by mass, and
   wherein the power storage device is not a power storage device having an electrode of aluminum.

2. The power storage device according to claim 1, wherein at least one of the two electrodes contains a metal oxide film on a surface of the plate-like crystal structure smectite-based clay film side.

3. The power storage device according to claim 1, wherein an interlayer ion of the smectite which is a component of the plate-like crystal structure smectite-based clay film is selected from the group consisting of a sodium ion, a lithium ion, and a trimethylstearylammonium ion.

4. The power storage device according to claim 1, comprising a separator between the two electrodes.

5. The power storage device according to claim 1, which is a capacitor.

6. The power storage device according to claim 1, which is a multilayer ceramic capacitor.

7. The power storage device according to claim 1, wherein the plate-like crystal structure smectite-based clay film contains at least one of saponite and hectorite.

* * * * *